June 12, 1945.  P. H. WALLER  2,378,267
CASE
Original Filed Oct. 18, 1940   2 Sheets-Sheet 1
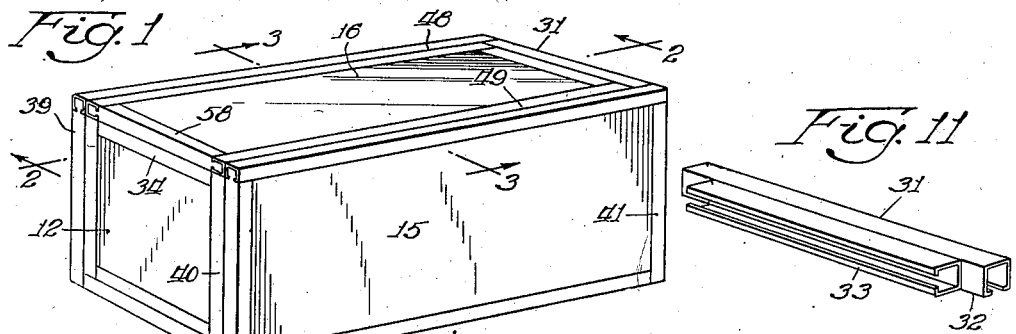
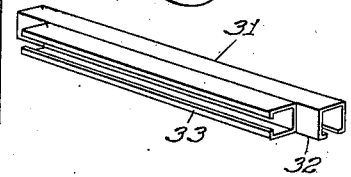
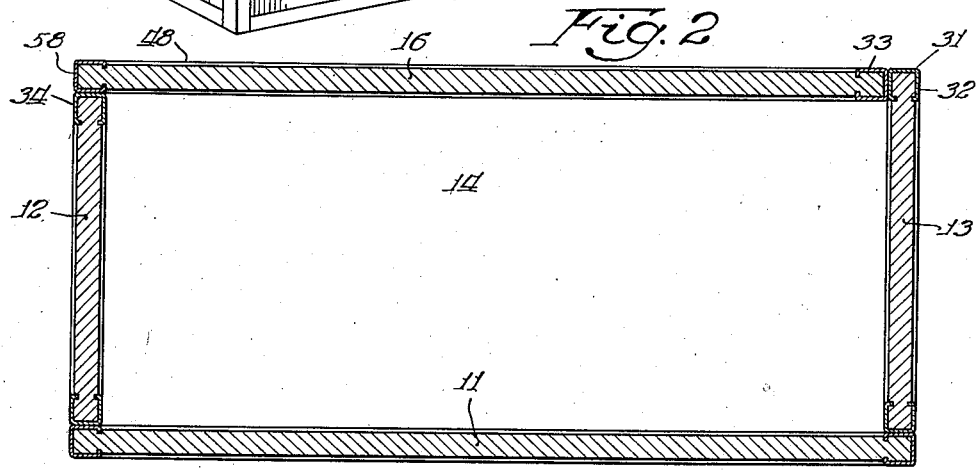
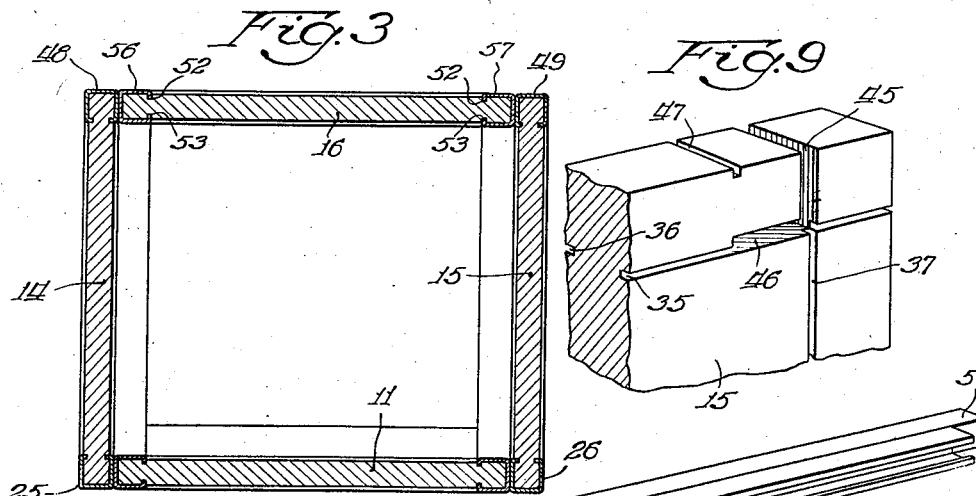
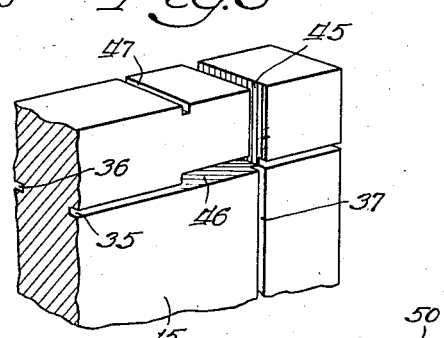
Inventor:
Percy H. Waller June 12, 1945.  P. H. WALLER  2,378,267
CASE
Original Filed Oct. 18, 1940   2 Sheets-Sheet 2
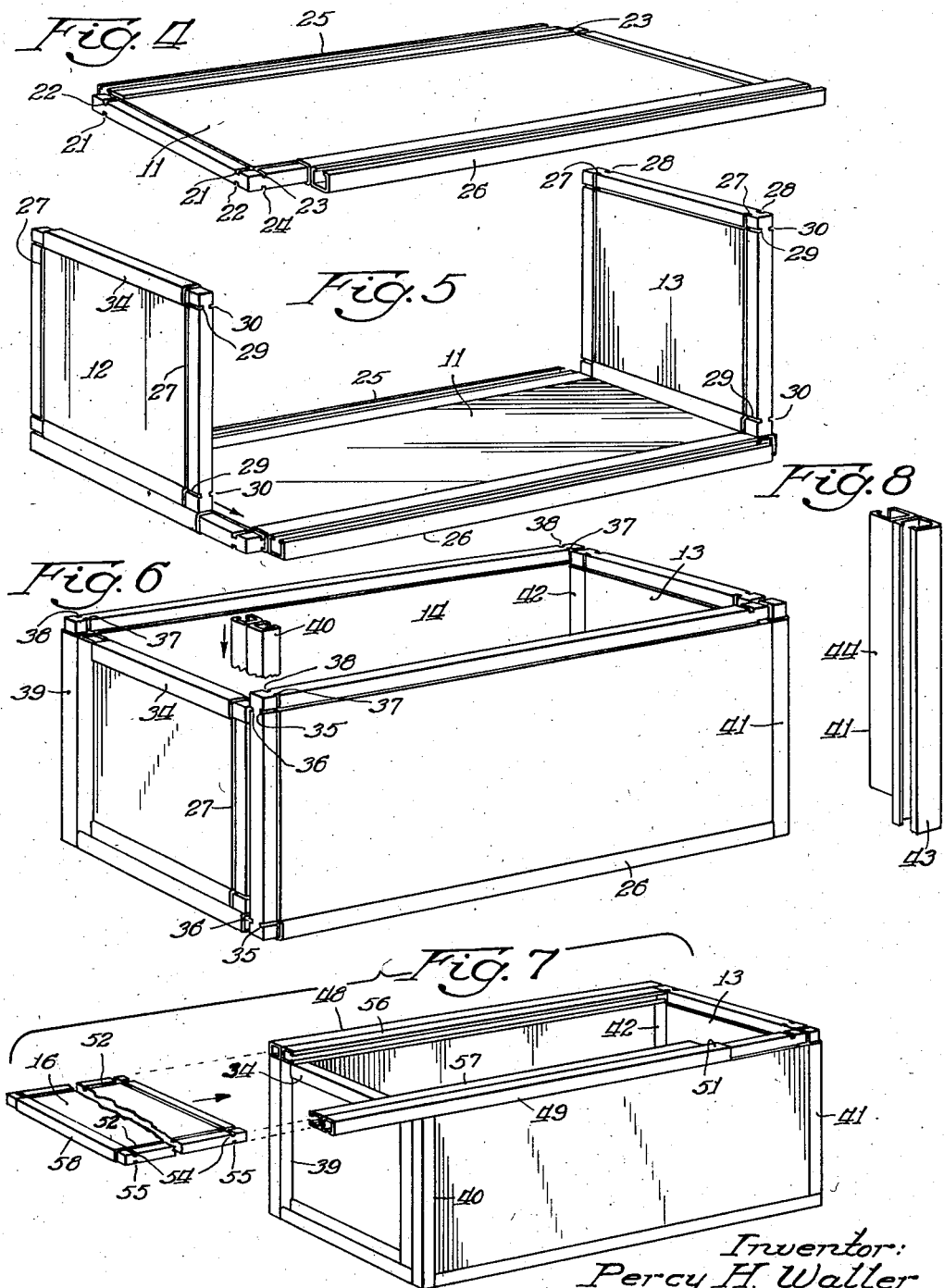

Patented June 12, 1945

2,378,267

UNITED STATES PATENT OFFICE 2,378,267

CASE

Percy H. Waller, Evanston, Ill., assignor of one-half to Charles C. Kirk

Original application October 18, 1940, Serial No. 361,692. Divided and this application June 19, 1942, Serial No. 447,710

3 Claims. (Cl. 217—12)

The present invention relates to the structural joining of walls and panels. It is particularly concerned with means for connecting together separate individual pieces of sheet material such as plywood and the various composition boards now available on the market. The invention contemplates further the application of the structure to the connecting together of panels of the various materials mentioned, so as to produce closed or open cases for various purposes. The invention is particularly applicable to the building of cases which are subjected to heavy duty, such, for example, as ammunition cases, gun cases, tool and machinery cases, and the like.

It is also a purpose of the invention to provide a structure whereby several panels of appropriate size and shape may be locked together in a closed case form where no nails, screws or bolts are necessary, the case being so put together that, without special tools, it can be quickly knocked down into a series of flat pieces of panel material and strips of structural metal that may be packed compactly.

This application is a division of my co-pending application, Serial No. 361,692, filed October 18, 1940, for Structural joining of walls for cases, partitions, and the like.

The invention as disclosed hereinafter is capable of a multiplicity of uses and adaptations to various problems of case construction, the enumeration of which would be quite long. It is believed, however, that the application of the present invention to the various problems will be apparent from the following description, wherein sufficient examples are shown to illustrate the scope and adaptability of the invention. It must be understood, however, that the drawings and description are illustrative only and are not to be taken as limiting the invention except insofar as it is limited by the claims.

In the drawings—

Fig. 1 is a perspective view of a case embodying the invention;

Fig. 2 is a sectional view taken on the line 2—2 of Fig. 1;

Fig. 3 is a sectional view taken on the line 3—3 of Fig. 1;

Fig. 4 is a perspective view illustrating in partly assembled condition the bottom panel and the connecting members or channels by which the bottom panel is connected to the side panels of the case shown in Fig. 1;

Fig. 5 is a perspective view illustrating the second stage in building the case of Fig. 1, where the end panels are being put in place;

Fig. 6 is a perspective view showing the placing of the side panels in place for the case shown in Fig. 1;

Fig. 7 is a perspective view illustrating the case completed, with the exception of the addition of the cover and the final locking by means of an end corner connecting channel and one of the top connecting channels between the cover and the side;

Fig. 8 is a perspective view of a vertical corner connecting channel;

Fig. 9 is an enlarged perspective view showing the upper right-hand corner of the panel which forms the side of the case closest to the observer, as shown in Fig. 1;

Fig. 10 is a perspective view of one of the top connecting channels by which the cover is attached to the case; and Fig. 11 is a perspective view of one of the end connecting channels which is utilized to connect the bottom and the cover to the end panels.

Referring now in detail to the drawings, the invention will first be described in connection with the case 10 illustrated in Fig. 1. The present invention, although not in any sense limited thereto, is particularly applicable to the construction of knockdown cases, partitions, forms and the like, where ability to withstand rough treatment is essential and where the repeated use of the structure, after being torn apart, is also a factor of economy and convenience. The case 10 shown herein is utilized as an example of how the invention makes possible a complete enclosure devoid of bolts, screws, or nails, yet capable of repeated assembling and disassembling without damage to the panels which make up its walls. The case, as shown, may desirably be made of plywood. It comprises a bottom panel 11, two end panels 12 and 13, two side panels 14 and 15, and a cover 16. The several panels are connected together by connecting channel units, the cross section of which is the same in every instance. Each connecting channel unit (see for example Fig. 10) comprises a channel-shaped part 17 having inturned lips 18 opposite the back, to provide a restricted entrance into the channel. Welded or otherwise suitably secured to the channel 17 is a duplicate channel 19, set at right angles to the channel 17 and having inturned lips 20, similar to the lips 18.

Referring now to Figs. 4 to 11, inclusive, the assembly of the case 10 will be described. It will be noted that the bottom panel 11 (Fig. 4) has longitudinally extending grooves 21 and 22 at the side edges thereof, and transversely extending grooves 23 and 24 at the end edges thereof. The grooves 21 and 22 are adapted to receive two connecting channels 25 and 26. These connecting channels are of just such length that, when applied to the side edges of the bottom panel 11, their ends terminate at the inside edges of the grooves 23 and 24. The channel 25 is shown in ultimate position in Fig. 4, while the channel 26 is being moved into position.

Referring now to Fig. 5, this figure illustrates the step of applying the end panels 12 and 13 to the bottom panel 11. The end panels 12 and 13 have grooves 27 and 28 along their vertical side edges, and like grooves 29 and 30 along their horizontal edges. In Fig. 11, the connecting channel utilized to connect each end piece, such as 12 or 13, to the bottom panel, is illustrated in detail. This connecting channel 31 has the bottom panel receiving portion 32 slightly longer than the end panel receiving portion 33, so that the portion 32, when mounted on the bottom panel 11, will reach to the side edges of the panel, while the portion 33 will terminate just inwardly of the grooves 27 and 28.

In making a packing case such as is illustrated in Fig. 1, one of the end panels, in this case the panel 12, is shorter vertically than the other and has a channel-shaped finishing strip 34 which is merely a single channel 17 having its inturned edges fitting in the grooves 29 and 30 at the top of the panel 12. The strip 34 is just long enough to cover the top edge of the panel 12 between the vertically running grooves 27 and 28.

In Fig. 6, the side panels 14 and 15 are shown to have been applied by sliding them into the upwardly facing channel portions of the connecting channels 25 and 26. These side panels are grooved adjacent the top and bottom edges by horizontally running grooves 35 and 36, and are grooved adjacent the end edges by vertically running grooves 37 and 38. The vertically running grooves 37 and 38 cooperate with the vertically running grooves 27 and 28 on the end panels 12 and 13 to receive the vertical corner connecting channels 39, 40, 41 and 42. For purpose of illustration, the corner connecting channel 41 is shown in detail in Fig. 8. It will be noted that the side panel receiving portion 43 extends below the end panel receiving portion 44, since the end panel receiving portion 44 will rest upon the extended portion 32 of the connecting channel 31. All four of the vertical corner connecting channels terminate just below the upper horizontally running grooves 35 and 36 of the side panels. The end panel 12 also terminates just below these grooves, but the end panel 13 extends up even with the top edge of the side panels 14 and 15.

The side panel 15 (see Fig. 9) is cut out at its upper right-hand corner, a vertical groove or slot 45 being cut in alignment with the grooves 37 and 38 through the panel down to the horizontal level of the grooves 35 and 36. A horizontal slot 46 is then cut inwardly from the slot 45 along the horizontal line of the grooves 35 and 36 a distance equal to the depth of one of the channel elements 17. A narrow groove 47 is cut in the top of the panel 15 opposite the slot 46, so that a connecting channel, such as 31, can be passed across a corner of the side panel 15 with the portion 33 being received by the slots 45 and 46 and the groove 47.

The final assembly of the case, including the application of the cover 16, is accomplished by using two upper corner connecting channels 48 and 49 (see Figs. 3, 7 and 10). These channel members are cut away at one end to provide reduced extensions, as indicated at 50 in Fig. 10, and 51 in Fig. 7. The connecting channel 48 is first slid into place, as shown in Fig. 7; then the connecting channel 49 is slid in partly, as shown in Fig. 7; thereafter the cover 16, which is provided with upper and lower grooves 52 and 53 at its side edges (see Figs. 3 and 7), and upper and lower grooves 54 and 55 at its end edges, is moved into place by sliding it in the opposed channel portions 56 and 57 of the channels 48 and 49. The cover 16 is moved all the way in until the end thereof abuts the end panel 13. At this point an end corner connecting channel, such as is shown in Fig. 11, is moved into place across the upper right-hand corner of the side panel 15, so that it effectively connects the cover panel 16 with the end panel 13. The connecting channel 49 is then moved all the way in until the extension 51 thereof passes across the end of the portion 33 of the member 31 at the top of the end panel 13. This locks the case so that the cover cannot be removed until the connecting channel 49 is moved outwardly and the connecting channel 31 on the top of the end panel 13 is completely removed to release the cover. A short protective single channel 58 is used at the back end of the cover 16 to cooperate with the channel 34 in giving a finished appearance to the case.

The case as shown and described includes the cover and locking means. However, the case is complete as an open top receptacle without adding the cover. Any suitable cover may be employed as desired. Also, any desired fittings may of course be employed inside and outside the case to adapt it for ease in handling and convenience in placement of materials therein.

The foregoing description is believed to be sufficient to enable those skilled in the art to understand the invention disclosed herein and to construct and use articles and structures embodying the same.

Having thus described my invention, what I claim as new and desire to secure by Letters Patent is:

1. A knockdown case comprising a bottom panel, four upright panels and a cover panel, means separably joining the several panels comprising metal strips composed of two channels each having inturned lips opposite the backs thereof, the back of one channel being fixed to a side of the other, said panels having grooves in the opposite sides thereof parallel to and adjacent to the peripheral edges thereof in which the inturned lips of said channels are slidably secured and held against edgewise movement, there being four strips uniting the bottom panel with the four upright panels, four upright strips uniting the end panels with the side panels, two strips slidably connecting the cover panel with two opposite upright panels, and another strip connecting the cover with one of the other upright panels, one of said two strips which slidably connect the cover with two opposite upright panels having a portion overlapping said last named strip to lock it in place.

2. A knockdown case comprising a bottom panel, four upright panels and a cover panel, means separably joining the several panels comprising metal strips composed of two channels each having inturned lips opposite the backs thereof; the back of one channel being fixed to a side of the other, said panels having grooves in the opposite sides thereof parallel to and adjacent to the peripheral edges thereof slidably receiving the inturned lips of said channels, there being four strips uniting the bottom panel with the four upright panels, four upright strips uniting the end panels with the side panels, two strips slidably connecting the cover panel with two opposite upright panels, and another strip connecting the cover with one of the other upright panels, one of said two strips which slidably connect the cover with two opposite upright panels having a portion overlapping said last named strip to lock it in place, and one of the upright panels being slotted to pass said last named strip.

3. A knockdown case comprising a bottom panel, four upright panels and a cover panel, means separably joining the several panels comprising metal strips composed of two channels each having inturned lips opposite the backs thereof, the back of one channel being fixed to a side of the other, said panels having grooves in the opposite sides thereof parallel to and adjacent to the peripheral edges thereof slidably receiving the inturned lips of said channels, there being four strips uniting the bottom panel with the four upright panels, four upright strips uniting the end panels with the side panels, two strips slidably connecting the cover panel with two opposite upright panels, and another strip connecting the cover with one of the other upright panels, one of the upright panels with which the cover is slidably connected being cut out at the corner to provide passage for said last named strip.

PERCY H. WALLER.